(12) United States Patent
Miura

(10) Patent No.: US 6,843,226 B2
(45) Date of Patent: Jan. 18, 2005

(54) INTAKE CONTROL APPARATUS FOR INTERNAL COMBUSTION ENGINE

(75) Inventor: Hajime Miura, Tama (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 10/701,613

(22) Filed: Nov. 6, 2003

(65) Prior Publication Data

US 2004/0112331 A1 Jun. 17, 2004

(30) Foreign Application Priority Data

Dec. 16, 2002 (JP) ........................................ 2002-363229

(51) Int. Cl.[7] .......................... F02D 13/00; F02M 25/07
(52) U.S. Cl. .................. 123/346; 123/568.14; 123/399; 123/90.15
(58) Field of Search ........................... 123/90.11, 90.15, 123/90.16, 90.17, 399, 361, 568.14, 346

(56) References Cited

U.S. PATENT DOCUMENTS

| | | | | |
|---|---|---|---|---|
| 5,494,008 A | * | 2/1996 | Ohkawa et al. | 123/90.17 |
| 6,000,375 A | * | 12/1999 | Isobe | 123/322 |
| 6,502,546 B2 | * | 1/2003 | Kawasaki et al. | 123/399 |
| 6,644,275 B2 | * | 11/2003 | Kondo | 123/406.47 |
| 2003/0106542 A1 | * | 6/2003 | Aoyama et al. | 123/568.14 |
| 2003/0226528 A1 | * | 12/2003 | Yamaoka et al. | 123/90.15 |

FOREIGN PATENT DOCUMENTS

JP          2002-89341 A       3/2002

* cited by examiner

*Primary Examiner*—Hai Huynh
(74) *Attorney, Agent, or Firm*—Shinjyu Global IP Counselors, LLP (57) ABSTRACT

An intake control apparatus is configured to control a variable valve operating mechanism and an opening degree of a throttle valve. The variable valve operating mechanism varies the valve lift characteristic of the intake valves to control the intake air amount into the cylinders of the engine. The throttle valve produces a negative pressure inside the collector, but in a valve control region including medium loads, the pressure inside the collector is fixed at a weak negative pressure and the intake air amount is controlled by varying the valve lift characteristic of the intake valves. In an internal EGR priority region of low loads, the negative pressure is strengthened somewhat and the lift/duration of the intake valves is increased. When the engine is cold, the negative pressure is adjusted to be close to atmospheric pressure and the lift/duration of the intake valves is reduced.

13 Claims, 8 Drawing Sheets

INTAKE CONTROL APPARATUS FOR INTERNAL COMBUSTION ENGINE

BACKGROUND OF THE INVENTION

1. Field of the Invention

The present invention relates to an intake control apparatus configured and arranged to control the amount of intake air drawn into cylinders of an internal combustion engine. More particularly, the present invention relates to an intake control apparatus for internal combustion engine that accomplishes control of the intake air amount by combining variable control of a valve lift characteristic of the intake valve with a control of opening degree of a so-called electronically controlled throttle valve.

2. Background Information

The intake air amount of a gasoline engine is generally controlled by controlling a throttle opening degree of a throttle valve provided in an intake passage. As is well known, this method has the problem of a large pumping loss during low to medium load operations when the throttle opening degree of the throttle valve is small. Meanwhile, there have been attempts in the past to control the intake air amount independently of the throttle valve by changing the opening/closing timing and the lift amount of the intake valves. Thus, a "throttle-less" construction has been proposed which, similarly to a diesel engine, does not have a throttle valve in the air intake system and the control of the intake air amount is accomplished by controlling the valve lift characteristic.

Japanese Laid-Open Patent Publication No. 2002-89341 discloses a variable valve operating mechanism which accomplishes continuous variable control of the lift and duration of the intake valves. With a variable valve operating mechanism of the type described in this publication, the amount of intake air drawn into the cylinders can be varied independently of the throttle opening degree of the throttle valve, as mentioned above. Particularly when the engine is operating in small-load regions, throttle-less operation or operation in which the throttle valve opening degree is kept sufficiently large can be accomplished and the pumping loss can be greatly reduced.

In view of the above, it will be apparent to those skilled in the art from this disclosure that there exists a need for an improved intake control apparatus for internal combustion engine. This invention addresses this need in the art as well as other needs, which will become apparent to those skilled in the art from this disclosure.

SUMMARY OF THE INVENTION

When the intake air amount is controlled by variably controlling the valve lift characteristic of the intake valves in a throttle-less manner, there are existing systems (e.g., systems in which blow-by gas and evaporator purge gas are circulated back to the air intake system) that cannot be used. It is difficult to obtain the negative pressure used as the drive source for actuators and the like if the engine is operated as completely throttle-less and no negative pressure is generated in the air intake system.

Therefore, one of the objectives of the present invention is to achieve a substantially throttle-less operating state in most operating regions by providing an electronically controlled throttle valve and combining control of the throttle opening degree of the throttle valve with variable control of the intake valve lift characteristic. In order to reduce the pumping loss caused by the throttle valve, the throttle opening degree of the throttle valve is generally adjusted to be as large as possible so that the negative pressure inside the collector downstream of the throttle valve is maintained at a minimum level necessary. Then, the amount of air taken into the cylinders is controlled to a target intake air amount by controlling the valve lift characteristic of the intake valves using a variable valve operating mechanism. The throttle opening degree of the throttle valve and the valve lift characteristic are controlled in accordance with the engine operating conditions. Especially, when the engine is operating in operation regions where the load is relatively low, it is advantageous in terms of fuel consumption to secure ample valve overlap by setting the duration of opening of the intake valves to a somewhat large value, thus executing internal EGR in an aggressive manner. In other words, in order to set the duration to a large value, it is necessary to decrease the throttle opening degree of the throttle valve and reduce the pressure inside the collector. Although the pumping loss caused by the throttle valve increases when the throttle opening degree of the throttle valve decreases, there is an operating region where the degradation of fuel consumption caused by the pumping loss is exceeded by the improvement in fuel consumption resulting from the internal EGR.

The present invention recognizes the fact that such operating region, called an "internal EGR priority region," exists. Thus, one of the objectives of the present invention is to improve fuel consumption when the engine operates in the internal EGR priority region and, at the same time, to improve exhaust emissions and fuel consumption when the engine operates at a low temperature. In other words, since the atomization of the fuel is poor when the engine is operating at a low temperature, the present invention is configured to decrease the lift of the intake valves and increase the flow speed of the intake air even when the engine is operating in the internal EGR priority region. In order to achieve these objects, an intake control apparatus for an internal combustion engine is provided that comprises a variable valve operating mechanism, a collector, a throttle valve and a control unit. The variable valve operating mechanism is configured and arranged to change a valve lift characteristic of a plurality of intake valves. The collector is connected to a plurality of intake passages fluidly coupled to a plurality of cylinders of the internal combustion engine. The throttle valve is adjustably positioned upstream of the collector to control an amount of air drawn into the collector by changing an opening degree of the throttle valve. The control unit is configured to adjust the opening degree by controlling the throttle valve and to adjust the valve lift characteristic by controlling the variable valve operating mechanism such that an intake air amount drawn into the cylinders reaches a target intake air amount that is set according to operating conditions of the internal combustion engine. The control unit is further configured to adjust the valve lift characteristic by controlling the variable valve operating mechanism to change the intake air amount while maintaining the opening degree of the throttle valve substantially at an opening degree that achieves a first prescribed negative pressure inside the collector when the internal combustion engine is operating in a valve control region including medium loads. The control unit is further configured to control the throttle valve to change the opening degree to achieve a second prescribed negative pressure that is more negative than the first prescribed negative pressure of the valve control region, and to adjust the valve lift characteristic by controlling the variable valve operating mechanism to control the intake air amount so that internal EGR is promoted with the second prescribed negative pressure when the internal combustion engine is operating in an internal EGR priority region including loads lower than the medium loads in the valve control region. The control unit is further configured to adjust the valve lift characteristic of the intake valves by controlling the variable valve operating mechanism and to adjust the pressure inside the collector closer to atmospheric pressure than the second prescribed negative pressure by controlling the opening degree of the throttle valve when the internal combustion engine is operating in the internal EGR priority region and a temperature of the internal combustion engine is lower than a prescribed temperature.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiment of the present invention will now be explained with reference to the drawings. It will be apparent to those skilled in the art from this disclosure that the following descriptions of the embodiment of the present invention are provided for illustration only and not for the purpose of limiting the invention as defined by the appended claims and their equivalents.

Figure 1:
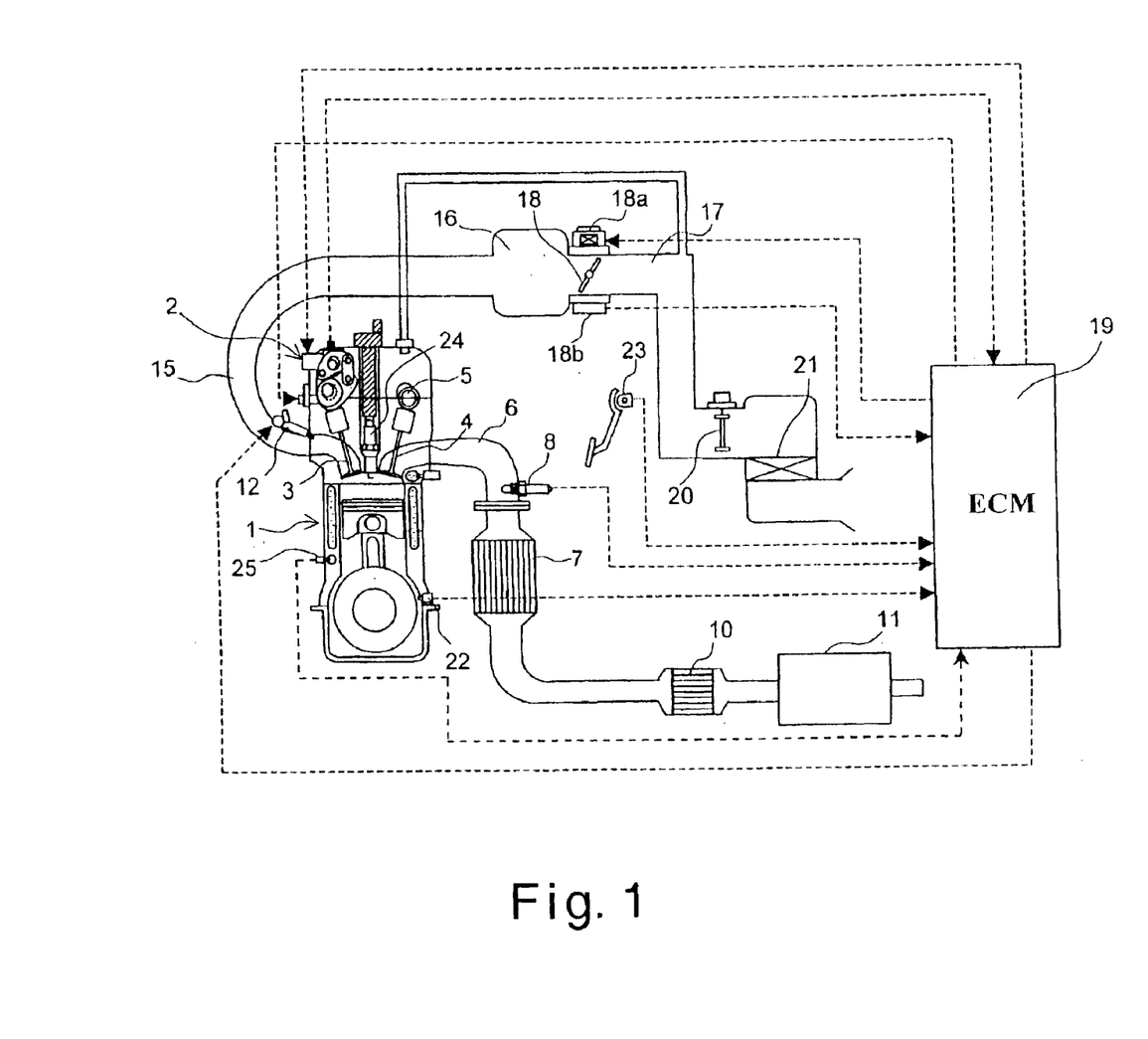
FIG. 1 is a schematic view illustrating a configuration of an intake control apparatus for an internal combustion engine in accordance with one embodiment of the present invention.

Referring initially to FIG. 1, an example of a system configuration of an intake control apparatus for an internal combustion engine 1 is illustrated in accordance with one embodiment of the present invention. As seen in FIG. 1, the internal combustion engine 1 is a spark ignition gasoline engine that has a plurality of cylinders with a plurality of intake valves 3 (only one intake valve 3 is shown) and a plurality of exhaust valves 4 (only one exhaust valve 4 is shown). The intake valves 3 are operatively coupled to a variable valve operating mechanism 2 that serves as a valve operating mechanism. The variable valve operating mechanism 2 is configured and arranged to change a valve lift characteristic of the intake valves 3. The valve lift characteristic of the intake valves 3 includes, but is not limited to, a lift and a duration of the intake valves 3. Thus, the variable valve operating mechanism 2 is configured and arranged to enlarge or reduce the lift and the duration of the intake valves 3 simultaneously and continuously. The duration of the intake valves 3 is defined by a working angle or an actuation angle of a crankshaft during the intake valves 3 are open. Accordingly, the valve lift characteristic of the intake valves 3 can be continuously varied by the variable valve operating mechanism 2. On the other hand, the exhaust valves 4 are driven directly by an exhaust camshaft 5, and thus, the valve lift characteristic of the exhaust valves 4 remains constant at all times.

A catalytic converter 7 is connected to the outlet side of an exhaust manifold 6 that gathers the exhaust gas from each of the cylinders. An air-fuel ratio sensor 8 is configured and arranged in the exhaust manifold 6 to detect the air-fuel ratio at a position upstream of the catalytic converter 7. The air-fuel ratio sensor 8 can be either an oxygen sensor that merely detects if the air-fuel ratio is rich or lean or a wide-range air-fuel ratio sensor that provides an output corresponding to the air-fuel ratio value. A second catalytic converter 10 and a muffler 11 are provided downstream of the catalytic converter 7.

A fuel injection valve 12 is provided on each cylinder and configured to inject fuel toward the intake port of each cylinder. A branch passage 15 is coupled to each intake port. The upstream end of each branch passage 15 is connected to a collector 16. One end of the collector 16 is coupled to an intake air inlet passage 17. The intake air inlet passage 17 is provided with an electronically controlled throttle valve 18. The throttle valve 18 has an actuator 18a comprising an electric motor. A throttle opening degree of the throttle valve 18 is controlled by a control signal delivered from an engine control unit 19. The throttle valve 18 is also provided with a sensor 18b configured to detect the actual opening degree of the throttle valve 18. The throttle opening degree of the throttle valve 18 is preferably controlled in a closed loop manner so as to match a target opening degree based on the detection signal of the sensor 18b. Also, an airflow meter 20 configured to detect the flow rate of the intake air is arranged upstream of the throttle valve 18. Moreover, an air cleaner 21 is provided further upstream of the air flow meter 20.

A crank angle sensor 22 is provided with respect to the crankshaft in order to detect the rotational speed of the internal combustion engine 1 and the angular position of the crankshaft. An accelerator position sensor 23 is configured and arranged to detect the position (depression amount) of an accelerator operated by a driver. An oil temperature sensor 25 is configured and arranged to detect the temperature of the lubricant oil. The oil temperature sensor 25 is preferably installed in the cylinder block of the internal combustion engine 1. The temperature of the lubricant oil is preferably used as the temperature of the internal combustion engine 1. The detection signals from the crank angle sensor 22, the accelerator position sensor 23, the oil temperature sensor 25 are fed to the engine control unit 19 along with the detection signals from the airflow meter 20 and the air-fuel ratio sensor 8 mentioned above. Based on these detecting signals, the engine control unit 19 is configured to control a volume and injection timing of the fuel injected by the fuel injection valves 12, the ignition timing of a plurality of spark plugs 24, the valve lift characteristic determined by the variable valve operating mechanism 2, the throttle opening degree of the throttle valve 18, and other factors or characteristics in operating the internal combustion engine 1.

The engine control unit 19 preferably includes a microcomputer with a control program that controls the amount of the intake air as discussed below. The engine control unit 19 can also include other conventional components such as an input interface circuit, an output interface circuit, and storage devices such as a ROM (Read Only Memory) device and a RAM (Random Access Memory) device. The microcomputer of the engine control unit 19 is programmed to control the amount of the intake air. The memory circuit stores processing results and control programs that are run by the processor circuit. The engine control unit 19 is operatively coupled to the other components of the intake control apparatus for internal combustion engine in a conventional manner. The internal RAM of the engine control unit 19 stores statuses of operational flags and various control data. The engine control unit 19 is capable of selectively controlling any of the components of the control system of the intake control apparatus for internal combustion engine in accordance with the control program. It will be apparent to those skilled in the art from this disclosure that the precise structure and algorithms for the engine control unit 19 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

Accordingly, in the intake control apparatus of the present invention, the engine control unit 19 is configured and arranged to control the throttle opening degree of the throttle valve 18 and the valve lift characteristic of the intake valves 3 such that the amount of intake air drawn into the cylinders reaches a target intake air amount that is set according to the operating conditions of the internal combustion engine 1. Especially, when the internal combustion engine 1 is operating in an internal EGR propriety region and when the internal combustion engine 1 is not in a cold-engine condition (e.g., when a temperature of the internal combustion engine 1 is not lower than a prescribed temperature), the engine control unit 19 is configured and arranged to set the throttle opening degree of the throttle valve 18 so that the internal EGR is promoted.

The internal EGR priority region is an engine operating region where the load is relatively low in which the degradation of fuel consumption caused by the pumping loss is exceeded by the improvement in fuel consumption resulting from the internal EGR. Thus, the throttle opening degree of the throttle valve 18 is set such that the negative pressure required to execute the internal EGR is developed in the collector 16. Also, the lift and the duration of the valve lift characteristics are set relatively large to provide ample valve overlap to promote the internal EGR. However, when the internal combustion engine 1 is in the cold-engine condition (e.g., when a temperature of the internal combustion engine 1 is equal to or lower than the prescribed temperature), the atomization of the fuel is poor and the internal EGR causes the combustion to become unstable. Thus, even when the internal combustion engine 1 is operating in the internal EGR priority region, when the internal combustion engine 1 is operating in the cold-engine condition, the intake control apparatus of the present invention is configured and arranged to control the throttle opening degree of the throttle valve 18 to a weaker negative pressure and decrease the lift and duration of the intake valves 3 so that the valve overlap becomes smaller in order to suppress the internal EGR. Also, by setting the lift of the intake valves 3 to a relatively small amount, the intake air flow speed is increased and atomization of the fuel is promoted. Thus, the intake control apparatus of the present invention can improve fuel consumption ever further and reduce hydrocarbons when the internal combustion engine 1 is operating in the cold-engine condition.

Figure 2:
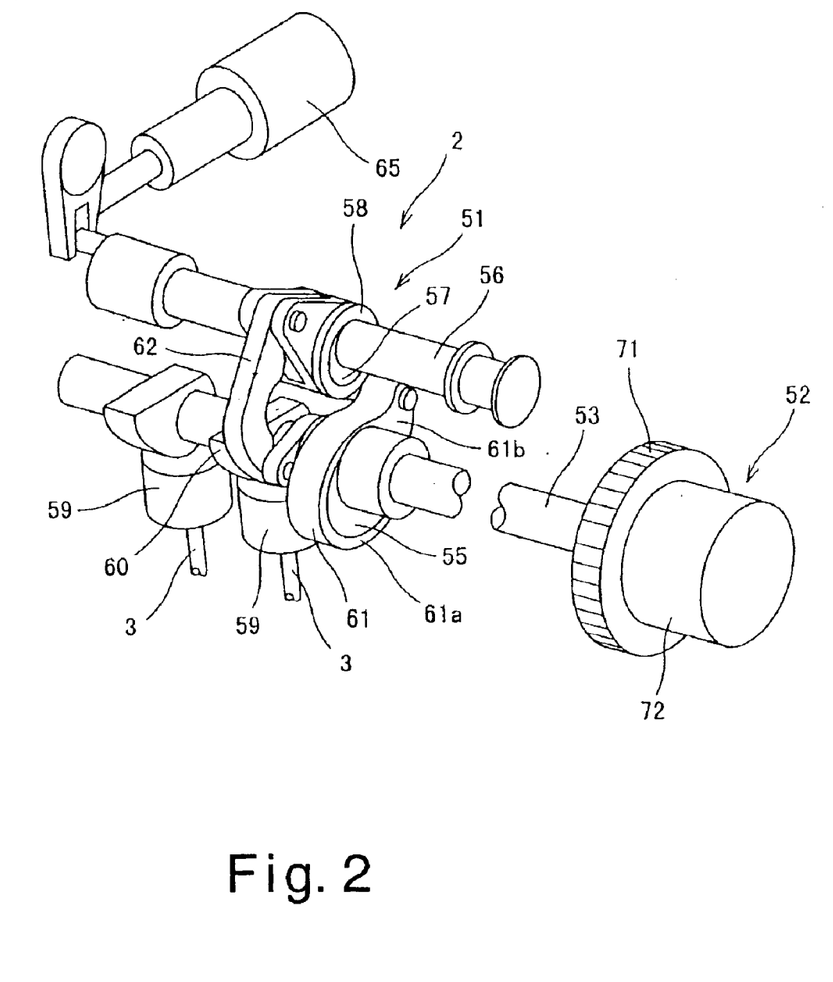
FIG. 2 is a perspective view illustrating key components of a variable valve operating mechanism of the intake control apparatus for the internal combustion engine in accordance with a preferred present invention.

Referring now to FIG. 2, the variable valve operating mechanism 2 of the intake valves 3 is explained in more detail. For example, the variable valve operating mechanism 2 is constructed according to the mechanism disclosed in Japanese Laid-Open Patent Publication No. 2002-89341 mentioned above. More specifically, as shown in FIG. 2, the variable valve operating mechanism 2 comprises a lift/duration varying mechanism 51 and a phase varying mechanism 52. The phase varying mechanism 52 of the variable valve operating mechanism 2 is configured and arranged to advance and retard a phase of a lift center angle (a phase with respect to the crankshaft). As mentioned above, the variable valve operating mechanism 2 is configured and arranged to vary the lift and duration of the intake valves 3 in a continuous manner. Since the variable valve operating mechanism 2 is configured and arranged to combine the operations of the lift/duration varying mechanism 51 and the phase varying mechanism 52, the open timing and the close timing of the intake valves 3 can be controlled independently of each other. Moreover, by changing the valve lift characteristic determined by the variable valve operating mechanism 2, the lift (the maximum lift amount) of the intake valves 3 can be reduced when the load is low so that the intake air amount is limited to an amount that is appropriate for the load. Furthermore, the amount of air taken into the cylinders is determined mainly by the open and close timing of the intake valves 3 when the internal combustion engine 1 is operating in regions where the lift amount is relatively large. However, when the internal combustion engine 1 is operating in a state where the lift amount is sufficiently small, the amount of air taken into the cylinders is controlled mainly by the lift amount.

Figure 3A:
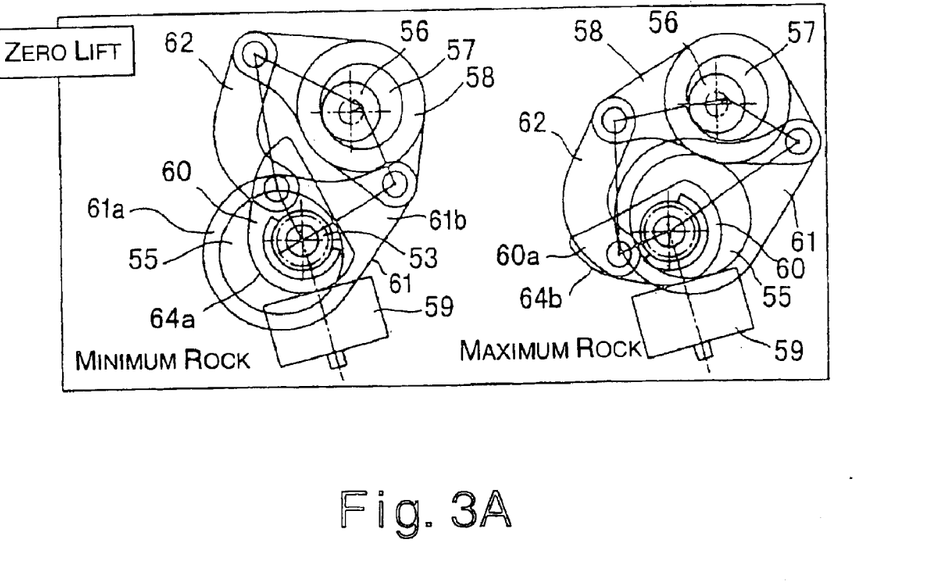
FIG. 3A is a diagrammatic view illustrating a zero lift operation of a lift/duration varying mechanism of the variable valve operating mechanism in accordance with the preferred embodiment of the present invention.
Figure 3B:
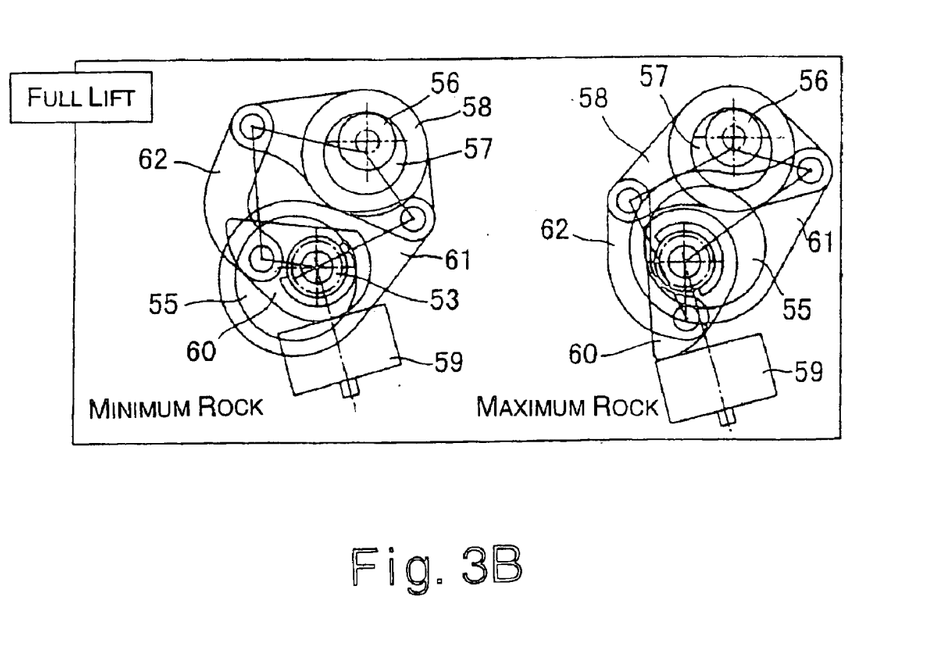
FIG. 3B is a diagrammatic view illustrating a full lift operation of a lift/duration varying mechanism of the variable valve operating mechanism in accordance with the preferred embodiment of the present invention.

Referring now to FIGS. 2, 3A and 3B, an overview of the operation of the lift/duration varying mechanism 51 will now be described. The lift/duration varying mechanism 51 basically comprises a hollow drive shaft 53, an eccentric cam 55, a control shaft 56, an eccentric cam part 57, a rocker arm 58, and a plurality of rocking cams 60. The drive shaft 53 is supported by the cylinder head such that it can rotate freely and is rotated by interlocking with the crankshaft. The eccentric cam 55 is fixed to the drive shaft 53. The control shaft 56 rotates freely and arranged above and parallel to the drive shaft 53. The rocker arm 58 is movably supported on the eccentric cam part 57 which is fixedly coupled to the control shaft 56 in such a manner that the rocker arm 58 can rock freely. The rocking cams 60 are configured and arranged to touch against tappets 59 that are located on the upper ends of the intake valves 3. The eccentric cam 55 and the rocker arm 58 are linked together by a link arm 61. The rocker arm 58 and the rocking cams 60 are linked together by a link member 62. The link arm 61 includes an annular part 61a that is configured and arranged to fit around the outer circumferential surface of the eccentric cam 55 such that the eccentric cam 55 can rotate within the annular part 61a. The link arm 61 also includes an extended part 61b that is linked to one end of the rocker arm 58. The other end of the rocker arm 58 is linked to the upper end of the link member 62. The eccentric cam part 57 is eccentric with respect to the center axis of the control shaft 56. As a result, the rocking center (fulcrum) of the rocker arm 58 changes in accordance with the angular position of the control shaft 56.

The rocking cams 60 shown in FIG. 2 are configured and arranged to be movably mounted on the outer surface of the drive shaft 53 and are supported thereon such that the rocking cams 60 can rotate freely relative to the drive shaft 53. The rocking cams 60 include outwardly extended end parts 60a that are linked to the lower end of the link member 62. The bottom surfaces of the rocking cams 60 each comprise a circular base surface 64a forming a circular arc that is concentric with respect to the drive shaft 53 and a cam surface 64b that extends along a prescribed curve from the circular base surface 64a to the end part 60a. The transition surface between the circular base surface 64a and the cam surface 64b is smooth. The circular base surface 64a is the section that contacts the tappet 59 when the lift amount is zero, as shown in FIG. 3A. The lift amount increase gradually as the rocking cam 60 turns and the cam surface 64b contacts the tappet 59 as shown in FIG. 3B.

The rotational position of the control shaft 56 is controlled with, for example, a lift/duration control actuator 65 that preferably comprises an electric motor. The lift/duration control actuator 65 is preferably provided at one end of the control shaft 56 as shown in FIG. 2.

When, the actuator 65 causes the eccentric cam part 57 to be in the high position as shown in FIG. 3A, the entire rocker arm 58 is positioned high and the end part 60a of the rocking cam 60 is pulled relatively upward. As a result, the initial position of the rocking cam 60 is such that the cam surface 64b is slanted away from the tappet 59. Therefore, when the rocking cam 60 rocks in response to rotation of the drive shaft 53, the circular base surface 64a remains in contact with the tappets 59 for a long period of time and the cam surface 64b contacts the tappet 59 for a short period of time. Thus, the overall lift amount of the intake valves 3 becomes small and the range of the working angle from valve open to valve close, i.e., the duration, is reduced.

On the other hand, when the eccentric cam part 57 is positioned low as shown in FIG. 3B, the entire rocker arm 58 is positioned low and the end part 60a of the rocking cam 60 is pushed relatively downward. As a result, the initial position of the rocking cam 60 is such that the cam surface 64b is slanted toward the tappet 59. Therefore, when the rocking cam 60 rocks in response to rotation of the drive shaft 53, the cam surface 64b contacts the tappet 59 for a relatively longer period of time. Thus, a large lift amount is obtained and the duration increases.

Figure 4:
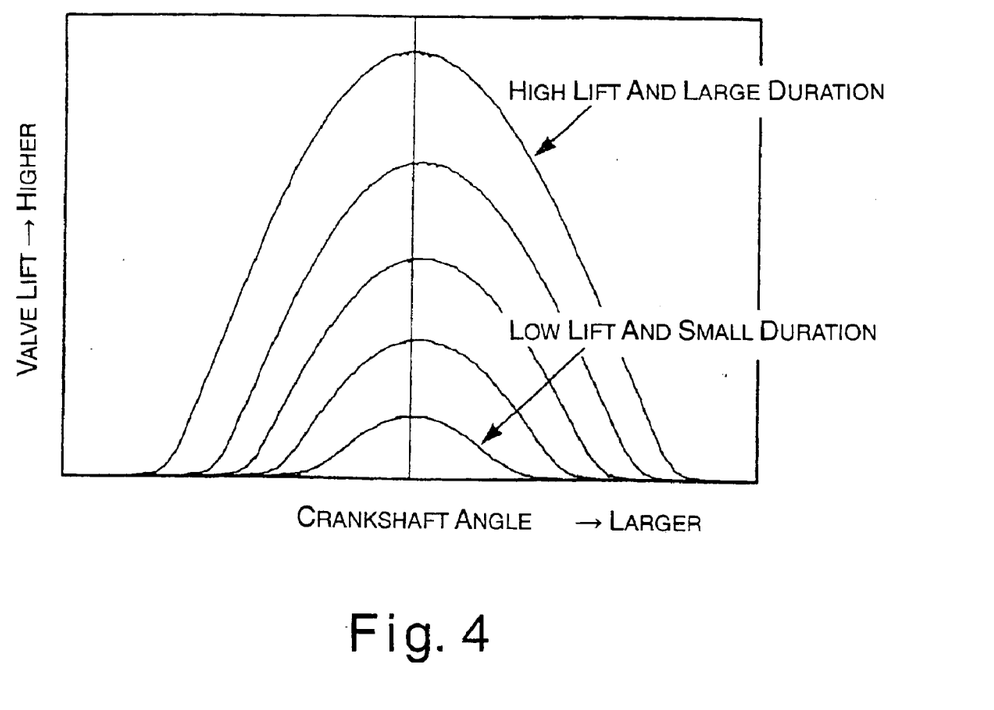
FIG. 4 is a chart illustrating how a lift and a duration of a valve lift characteristic change due to the lift/duration varying mechanism in accordance with the preferred embodiment of the present invention.

Since the initial position of the eccentric cam part 57 can be varied in a continuous manner, the valve lift characteristic can be varied in a continuous manner, as shown in a chart of FIG. 4. In other words, both the lift and the duration can be increased and decreased simultaneously in a continuous manner by controlling the lift/duration varying mechanism 51 of the variable valve operating mechanism 2.

Figure 5:
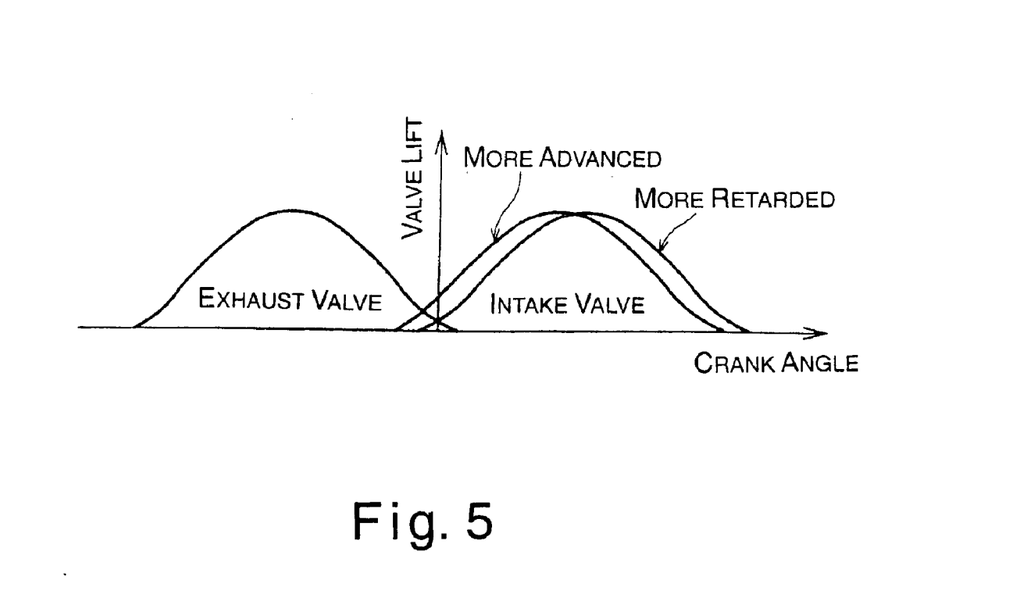
FIG. 5 is a timing chart illustrating how a phase of the valve lift characteristic changes due to a phase varying mechanism of the variable valve operating mechanism in accordance with the preferred embodiment of the present invention.

Referring back to FIG. 2, the phase varying mechanism 52 of the variable valve operating mechanism 2 is now described in more detail. The phase varying mechanism 52 basically comprises a sprocket 71 and a phase control hydraulic actuator 72. The sprocket 71 is provided on a front end part of the drive shaft 53. The phase control hydraulic actuator 72 is configured and arranged to rotate the sprocket 71 and the drive shaft 53 relative to each other within a prescribed relative angle. The sprocket 71 is interlocked with the crankshaft through a timing chain or timing belt (not shown). By controlling the hydraulic pressure of the phase control hydraulic actuator 72, the sprocket 71 and the drive shaft 53 are rotated relative to each other and the lift center angle is retarded or advanced as shown in a chart in FIG. 5. Thus, the entire valve lift characteristic of the intake valves 3 is advanced or retarded without changing the shape of the lift characteristic curves shown in FIG. 4. In other words, the lift center angle of the intake valves 3 is advanced or retarded independently of the lift and the duration of the intake valves 3.

The lift/duration varying mechanism 51 and the phase varying mechanism 52 are preferably controlled by closed loop control in which sensors are provided to detect the actual lift, duration, and phase. Alternatively, the lift/duration varying mechanism 51 and the phase varying mechanism 52 can be controlled by simple open loop control in which the mechanisms are controlled in accordance with the operating conditions.

Accordingly, in the intake control apparatus of the present invention, since the intake valves 3 are provided with the variable valve operating mechanism 2 as described above, the intake air amount can be controlled by variably controlling the intake valves 3 substantially independently of the throttle valve 18. However, in a practical sense, it is preferable for some negative pressure to exist in the air intake system of the internal combustion engine 1 for recirculation of blow-by gas and the like. Therefore, even in operating regions where variable control of the intake valves 3 is conducted to control the amount of intake air, the throttle valve 18 is closed slightly to produce a negative pressure inside the collector 16.

Figure 6:
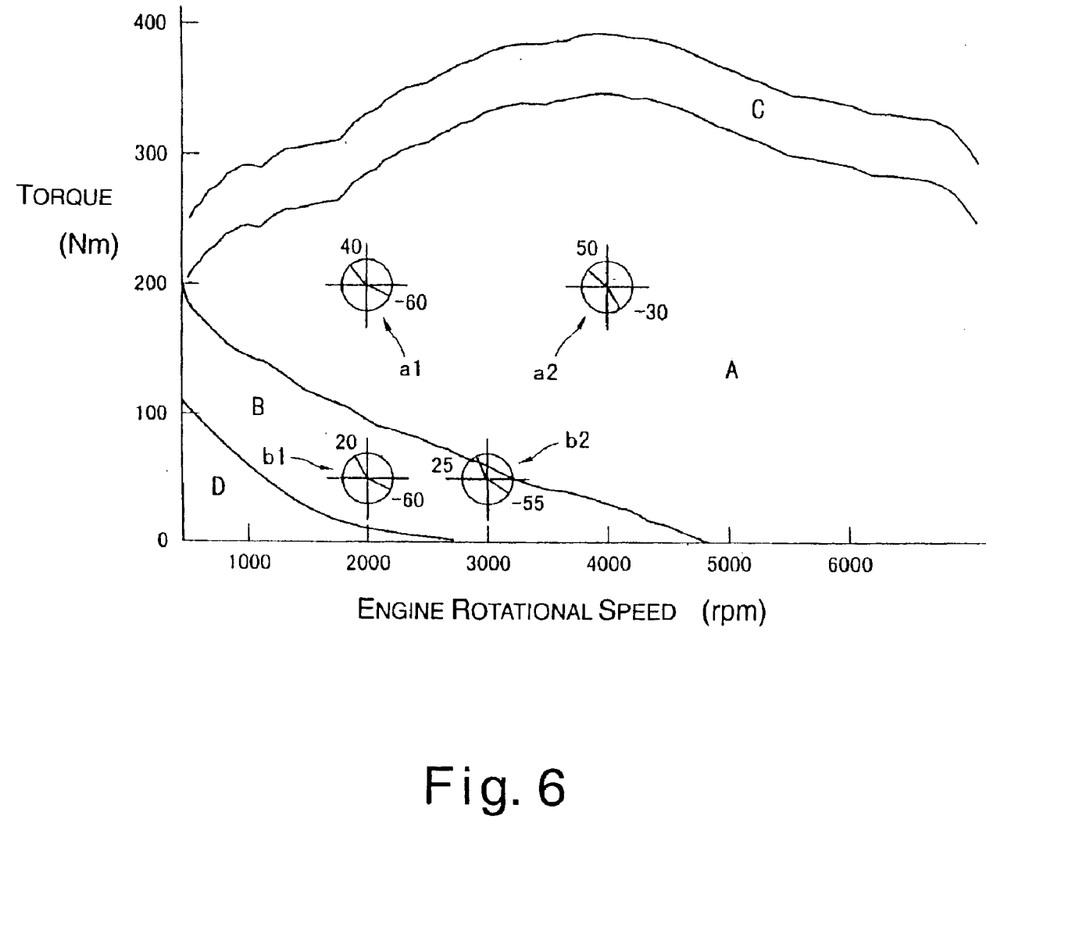
FIG. 6 is a chart showing a plurality of control regions along with representative valve timings of the intake control apparatus for the internal combustion engine in accordance with the preferred embodiment of the present invention.

FIG. 6 is a chart illustrating a plurality of control regions defined by the engine rotational speed and the torque in accordance with one embodiment of the present invention. In FIG. 6, a first prescribed region is defined as a valve control region A that mainly includes medium loads. A second prescribed region including loads lower than the valve control region A is defined as the internal EGR priority region B. Additionally, in the one embodiment of the present invention, a high-load region is defined as a fully open region C and a very-low-load region that includes idling is defined as a limited lift region D.

In the valve control region A, the intake air amount is controlled mainly by controlling the valve lift characteristic (e.g., the lift and the duration) of the intake valves 3 using the variable valve operating mechanism 2. The throttle opening degree of the throttle valve 18 in the valve control region A is preferably maintained so that the pressure inside the collector 16 becomes substantially close to a first prescribed negative pressure, i.e., a minimum negative pressure. The minimum negative pressure is a minimum amount of the negative pressure that is close to an atmospheric pressure and that is required to serve as a negative pressure source (e.g., −50 mmHg). More specifically, the throttle opening degree of the throttle valve 18 is maintained to a relatively large degree that is nearly fully open. In a simple arrangement of the present invention, the throttle opening degree of the throttle valve 18 can be held fixed in order to maintain the minimum negative pressure. Alternatively, the minimum negative pressure can be maintained by controlling the throttle opening degree of the throttle valve 18 in accordance with the rotational speed of the internal combustion engine 1. For example, in the valve control region A, the throttle valve 18 can be closed slightly when the rotational speed of the internal combustion engine 1 is decreasing to produce or maintain a negative pressure of about −50 mmHg. In any event, the control of the intake air amount is ultimately accomplished by the variable valve operating mechanism 2.

FIG. 6 also shows examples of the valve lift characteristics of the intake valves 3 at some representative operating points. The valve lift characteristics shown in FIG. 6 are examples of the valve lift characteristics that are used when the internal combustion engine 1 is fully warmed up, i.e., the internal combustion engine 1 is not in the cold-engine condition. For example, the valve lift characteristic at operating point a1 in the valve control region A is preferably set such that an IVO (intake valve open timing) is 40 degrees before top dead center and an IVC (intake valve close timing) is 60 degrees before bottom dead center. The valve lift characteristic at operating point a2 in the valve control region A is preferably set such that the IVO is 50 degrees before top dead center and the IVC is 30 degrees before bottom dead center, as seen in FIG. 6. These valve lift characteristics in the valve control region A are set based on the assumption that the minimum negative pressure which is close to atmospheric pressure, e.g., −50 mmHg, exists inside the collector 16. With that assumption, the IVC is generally set to a position that is much more advanced than the bottom dead center in order to limit the intake air amount, and the IVO is generally set to a position that is more advanced than the top dead center.

Accordingly, when the internal combustion engine 1 is operating in the valve control region A, the engine control unit 19 is configured to control the intake air amount by controlling the valve lift characteristic determined by the variable valve operating mechanism 2 while keeping the throttle valve 18 at such an opening degree that the first prescribed negative pressure is achieved inside the collector 16. As mentioned above, the first prescribed negative pressure is the minimum negative pressure necessary to serve as a negative pressure source, e.g., approximately −50 mmHg. In other words, the throttle opening degree of the throttle valve 18 is quite large and close to fully open with the intake air amount being ultimately controlled by the variable valve operating mechanism 2. For example, if the lift and the duration of the intake valves 3 are reduced by changing the valve lift characteristic, the intake air amount drawn into the cylinders decreases accordingly. In other words, in the valve control region A, the valve lift characteristic is varied according to the operating condition of the internal combustion engine 1 and the intake air amount, i.e., the engine torque, is controlled by the valve lift characteristic determined by the variable valve operating mechanism 2. Thus, even though the throttle valve 18 is provided, the pressure inside the collector 16 is set to a weak negative pressure, i.e., the minimum negative pressure, close to atmospheric pressure and the intake air amount is controlled by controlling the valve lift characteristic of the intake valves 3. Thus, a substantially throttle-less operation is achieved and the pumping loss due to the throttle valve 18 is greatly reduced by maintaining the throttle valve 18 at an amply large opening degree. Also, since the minimum negative pressure is secured inside the collector 16, the various systems required in practical engines that use negative pressure, e.g., recirculation of blow-by gas, can be used essentially as is without any major modifications.

The fully open region C is a high-load region as shown in FIG. 6. In the fully open region C, high filling efficiency or high charging efficiency (ratio of actual intake to theoretically possible charging quantity of the cylinder) is required. Thus, the throttle opening degree of the throttle valve 18 is increased in accordance with the required torque until it reaches fully open. In other words, in the fully open region C, the pressure inside the collector 16 is adjusted between −50 mmHg and atmospheric pressure in accordance with the required torque. The valve lift characteristic is set to a relatively large lift and duration in order to secure a high charging efficiency. More specifically, the valve lift characteristic in the fully open region C is preferably set such that the IVO is positioned before the top dead center and the IVC is positioned after the bottom dead center.

The limited lift region D including the low-speed and low-load region is an operating region in which the intake air amount is mainly controlled by controlling the throttle opening degree of the throttle valve 18. In the limited lift region D, the lift and the duration of the intake valves 3 are reduced by the variable valve operating mechanism 2 to a relatively small lift and duration. More specifically, in the limited lift region D, the valve lift characteristic of the intake valves 3 is held fixed by the variable valve operating mechanism 2 and the amount of intake air required based on the operating conditions is mainly controlled by controlling the throttle opening degree of the throttle valve 18. In other words, the throttle opening degree of the throttle valve 18 is increased and decreased in accordance with the operating condition of the internal combustion engine 1. Thus, the intake air amount, i.e., the engine torque, is controlled by the throttle opening degree of the throttle valve 18.

The internal EGR priority region B is a region where the degradation of fuel consumption caused by the pumping loss is exceeded by the improvement in fuel consumption resulting from the internal EGR. Thus, in the internal EGR priority region B, The throttle opening degree of the throttle valve 18 is reduced and the duration of the intake valves 3 is enlarged so as to ensure internal EGR is conducted. In the internal EGR priority region B, even though the pumping loss increases by reducing the throttle opening degree of the throttle valve 18, the fuel consumption is improved further overall due to the internal EGR. The pressure inside the collector 16 is controlled to a negative pressure that is more strongly negative than the first prescribed negative pressure which is close to the atmospheric pressure (e.g., −50 mmHg) used in the valve control region A. The negative pressure that is more strongly negative than the first prescribed negative pressure is defined as a second prescribed negative pressure. For example, in the internal EGR priority region B, the throttle opening degree of the throttle valve 18 is preferably adjusted such that the negative pressure becomes approximately −100 mmHg. A target negative pressure in the internal EGR priority region B (e.g., −100 mmHg) is preferably achieved by varying the pressure inside the collector 16 gradually in accordance with the required torque in order to suppress abrupt changes at the boundaries between the control regions. Alternatively, the second prescribed negative pressure can be held fixed throughout the entire internal EGR priority region B in order to simplify the control. The valve lift characteristic of the intake valves 3 is set by the variable valve operating mechanism 2 based on the negative pressure in the internal EGR priority region B. Thus, the valve lift characteristic is set such that the lift and the duration become larger than the lift and the duration if the negative pressure were set to the same negative pressure as in the valve control region A (e.g., −50 mmHg). For example, as shown in FIG. 6, the valve lift characteristic at the operating point b1 in the internal EGR priority region B is set such that the IVO is 20 degrees before the top dead center and the IVC is 60 degrees before the bottom dead center. Also, the valve lift characteristic at the operating point b2 in the internal EGR priority region B is set such that the IVO is 25 degrees before the top dead center and the IVC is 55 degrees before the bottom dead center. As mentioned above, the valve lift characteristics shown in FIG. 6 are used when the internal combustion engine 1 is fully warmed up. By increasing the duration of the intake valves 3, ample valve overlap is ensured with respect to a period when the exhaust valves 4 are open, and a comparatively large degree of internal EGR is achieved. As a result, the fuel consumption is good.

Accordingly, the internal EGR priority region B is defined as a region of lower loads than the valve control region A. In other words, the reduction of the pumping loss caused by the throttle valve 18 takes priority when in the valve control region A, while the improvement in fuel consumption caused by the internal EGR takes priority when in the internal EGR priority region B. Thus, when the internal combustion engine 1 is operating in the internal EGR priority region B, the engine control unit 19 is configured to control the throttle opening degree of the throttle valve 18 such that the pressure inside the collector 16 is at a stronger negative pressure than the minimum negative pressure of the valve control region A. Also, the engine control unit 19 is configured to control the intake air amount using a larger lift and a larger duration of the valve lift characteristic based on the stronger negative pressure so that the internal EGR is executed in the internal combustion engine 1. Thus, the lift and duration are controlled to be comparatively large so as to achieve the internal EGR through valve overlapping and, simultaneously, the pressure inside the collector is reduced. Thus, the throttle opening degree of the throttle valve 18 is controlled to achieve a stronger negative pressure than the minimum negative pressure used in the valve control region A and the valve lift characteristic is adjusted so as to achieve the target intake air amount under the stronger negative pressure.

Next, the intake control executed when the temperature of the internal combustion engine 1 is low (a cold-engine condition) will now be described. When the temperature of the internal combustion engine 1 is low and when the internal combustion engine 1 is operating in the internal EGR priority region B, the atomization of the fuel is not promoted. This cold-engine condition causes a degradation of fuel consumption and an increased rate of hydrocarbons in the exhaust gas. Thus, when the internal combustion engine 1 is in the cold-engine condition and operating in the internal EGR priority region B, the engine control unit 19 is configured to control the variable valve operating mechanism 2 and the throttle valve 18 such that the lift and the duration used in the internal EGR priority region B decrease and the pressure inside the collector 16 becomes closer to an atmospheric pressure in comparison with when the internal combustion engine 1 is completely warmed up. Since the lift of the intake valves 3 is reduced when the temperature of the internal combustion engine 1 is low, the speed of the air flowing into the cylinders increases. In the present invention, the fuel is preferably supplied by being injected toward the air intake port from the fuel injection valve 12 located upstream of the air intake valve. Thus, increasing the flow speed of the intake air improves the atomization of the fuel. Accordingly, the fuel consumption is increased and the hydrocarbon in the exhaust gas is reduced. For example, setting the lift of the intake valves 3 to approximately 0.3 millimeters to approximately 2 millimeters increases the intake air flow speed to a speed close to the speed of sound and promotes atomization.

Also, by reducing the lift of the intake valves 3 during the cold-engine condition, the duration of the intake valve 3 is also reduced simultaneously. Thus, the valve overlap becomes smaller and internal EGR is suppressed. When the temperature of the internal combustion engine 1 is low, internal EGR causes the combustion to become unstable. Therefore, reduction of the lift and the duration of the intake valves 3 as described above is desirable in terms of suppressing the internal EGR during cold-engine condition.

When the variable valve operating mechanism 2 of the intake valves 3 is configured such that it can retard and advance the phase of the lift center angle as in the present invention, it is preferred to retard the lift center angle simultaneously with the reduction of the lift and duration when the temperature of the internal combustion engine 1 is low. For example, the lift center angle is preferably retarded to such a position that the IVO comes after the piston reaches top dead center. Accordingly, by setting the IVO after the top dead center, the gas flow inside the cylinder is strengthened.

Figure 7A:
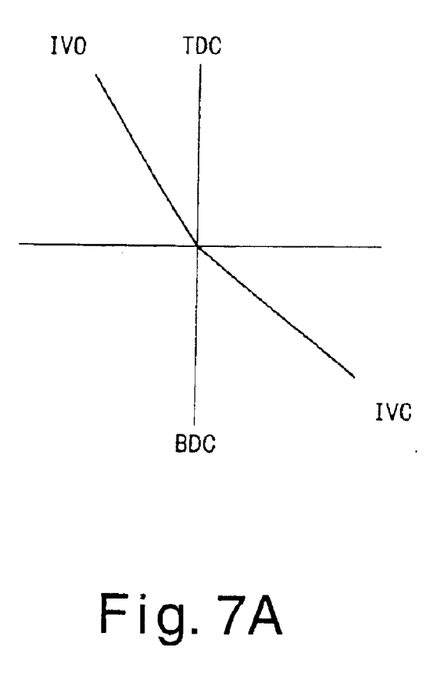
FIG. 7A is a diagrammatic view illustrating a first valve timing that achieves a target torque in the intake control apparatus for the internal combustion engine in accordance with the preferred embodiment of the present invention.
Figure 7B:
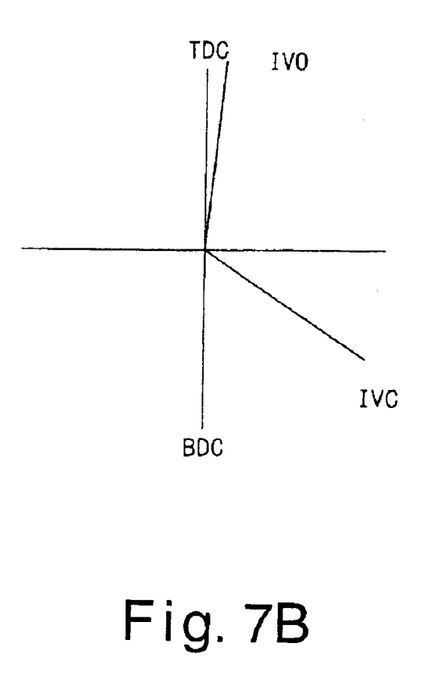
FIG. 7B is a diagrammatic view illustrating a second valve timing that achieves the same target torque in the intake control apparatus for the internal combustion engine in accordance with the preferred embodiment of the present invention.

When the internal combustion engine 1 is provided with both the variable valve operating mechanism 2 and the electronically controlled throttle valve 18 as in the present invention, various possible valve timings or valve lift characteristics can be used to achieve a given target torque. In other words, the same torque can be generated with different valve timings. For example, FIGS. 7A and 7B show two different valve timings of the intake valves 3 that can achieve the same torque by varying the negative pressure inside the collector 16. The torque achieved by the valve timings shown in FIGS. 7A and 7B is a comparatively low torque. Comparing the valve lift characteristics shown in FIGS. 7A and 7B, in order to achieve the same torque, the negative pressure inside the collector 16 is set stronger when the valve lift characteristic shown in FIG. 7A is used, and the negative pressure inside the collector case 16 is set closer to atmospheric pressure when the valve lift characteristic shown in FIG. 7B is used. As seen in FIGS. 7A and 7B, the valve lift characteristic shown in FIG. 7B has a smaller duration and a smaller lift than the valve lift characteristic shown in FIG. 7A. Consequently, flow speed of the intake air flowing into the cylinders through the intake valves 3 is higher in the case of the valve lift characteristic shown in FIG. 7B is used. Thus, the characteristic shown in FIG. 7B is superior with respect to atomization of the fuel, which is a problem when the temperature of the internal combustion engine 1 is low, and advantageous in terms of improving combustion stability through stronger gas flow.

Accordingly, the intake control apparatus of the present invention is configured and arranged to use the valve lift characteristic that is more suitable for the cold-engine condition even when the internal combustion engine 1 is operating in the internal EGR priority region B shown in FIG. 6. In other words, the valve lift characteristic used when the temperature of the internal combustion engine 1 is low has a smaller lift (duration) than the valve lift characteristic used after the internal combustion engine 1 is completely warmed up in the internal EGR priority region B. The temperature of the internal combustion engine 1 is preferably determined from the oil temperature detected by the oil temperature sensor 25. At the same time, when the internal combustion engine 1 is operating in the internal EGR priority region B and when the temperature of the temperature of the internal combustion engine 1 is low, the throttle valve 18 is set to a relatively large opening degree in order to obtain the target intake air amount properly so that the pressure inside the collector 16 is closer to atmospheric pressure than the pressure value used after the internal combustion engine 1 has completely warmed up. In other words, when the internal combustion engine 1 is operating in the internal EGR priority region B and when the temperature of the temperature of the internal combustion engine 1 is low, the pressure inside the collector 16 is set to a weaker negative pressure than when the internal combustion engine 1 is completely warmed up.

Figure 8:
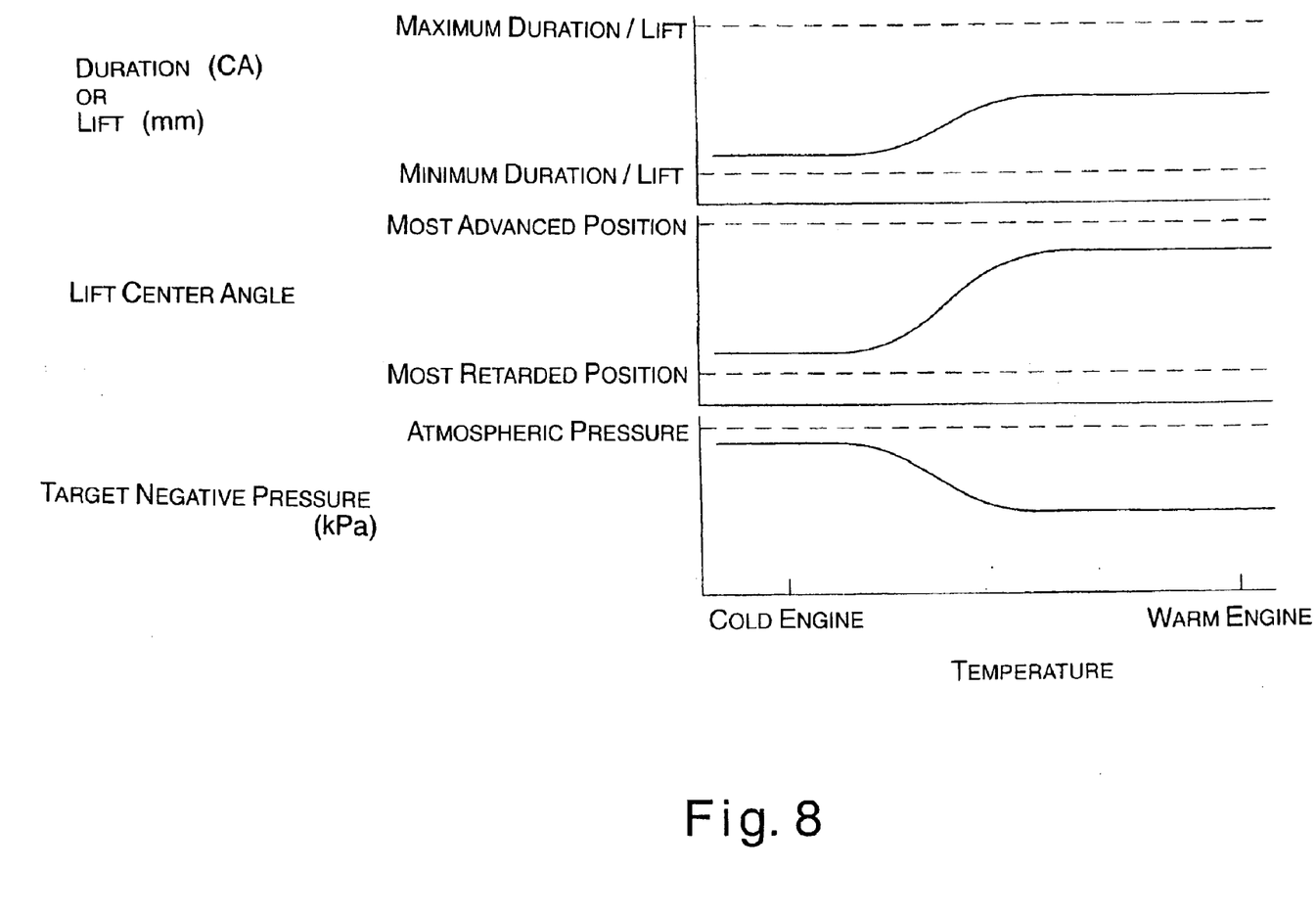
FIG. 8 is a chart showing an example of the valve lift characteristic and a target negative pressure characteristic plotted versus temperature.

FIG. 8 shows an example of the valve lift characteristic and a target negative pressure plotted versus the temperature of the internal combustion engine 1 for one operating point in the internal EGR priority region B. As described previously, when the internal combustion engine 1 is completely warmed up (warm engine) and operating in the internal EGR priority region B, the negative pressure inside the collector 16 is controlled to, for example, approximately −100 mmHg. Also, the lift and the duration are increased to meet the valve lift characteristic that achieves internal EGR. Moreover, the lift center angle is adjusted to a comparatively advanced state as seen in FIG. 8. However, when the temperature of the internal combustion engine 1 is low (cold-engine condition), the negative pressure inside the collector 16 is adjusted to a value close to atmospheric pressure, e.g., the −50 mmHg, used in the valve control region A even when the internal combustion engine 1 is operating in the internal EGR priority region B. Also, the lift and the duration are reduced, and the lift center angle is retarded greatly as shown in FIG. 8. The target negative pressure and the valve lift characteristic are set such that the amount of air flowing into the cylinders is substantially the same as when the internal combustion engine 1 is completely warmed up. As the temperature of the internal combustion engine 1 rises, the lift and the duration are gradually increased, the lift center angle is gradually advanced, and the negative pressure inside the collector 16 is gradually strengthened as shown in FIG. 8. Accordingly, the valve lift characteristic is varied in a continuous manner as the internal combustion engine 1 progressively warms up. Then, ultimately, the previously described valve lift characteristic and the target negative pressure for use in the internal EGR priority region B after the internal combustion engine 1 is completely warmed up is achieved.

Accordingly, in the control during the cold-engine condition, the valve lift characteristic is set such that the lift of the intake valves 3 becomes small. Therefore, the flow speed of the air flowing into the cylinders increases, and thus, the atomization of the fuel injected from the fuel injection valves 12 is promoted. Furthermore, since the gas flows more actively inside the cylinder, internal EGR is suppressed. Thus, good, stable combustion is achieved. Consequently, the emission of hydrocarbons is suppressed and the cold-engine fuel consumption is improved. It is also preferred in the control during the cold-engine condition to adjust the IVO timing to occur after top dead center as shown in FIG. 7B by retarding the lift center angle, thereby further increasing the activity level of the gas flow.

Figure 9:
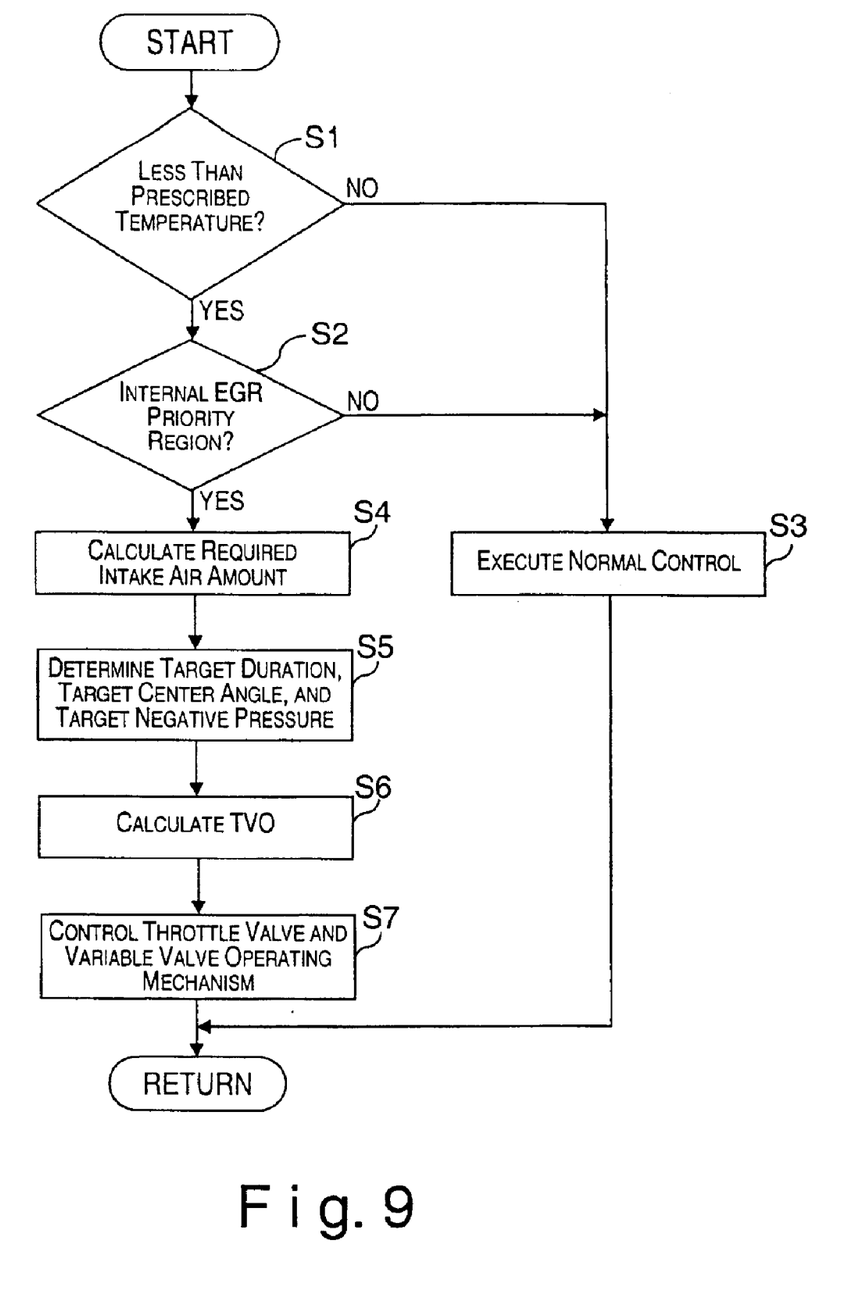
FIG. 9 is a flowchart showing the control flow executed in the intake control apparatus for the internal combustion engine in accordance with the preferred embodiment of the present invention.

The flowchart of FIG. 9 summarizes the control flow during the cold-engine condition executed in the intake control apparatus for internal combustion engine in accordance with the present invention. In step S1, the engine control unit 19 is configured to determine if the temperature of the internal combustion engine 1 is less than or equal to a prescribed temperature. The temperature of the internal combustion engine 1 is preferably determined based on an oil temperature detected by the oil temperature sensor 25. Of course, it will be apparent to those skilled in the art from this disclosure that it is also possible to use the temperature of the coolant or the temperature of the intake air as the engine temperature instead of the oil temperature. The prescribed temperature is set to a temperature above which the internal combustion engine 1 is considered to have completely warmed up. When the temperature of the internal combustion engine 1 (the oil temperature) is higher than the prescribed temperature, the intake control apparatus proceeds to step S3 and executes normal control according to the control region in which the internal combustion engine 1 is operating. On the other hand, if it is determined in step S1 that the temperature of the internal combustion engine 1 is less than or equal to the prescribed value, the control proceeds to step S2.

In step S2, the engine control unit 19 is configured to determine if the internal combustion engine 1 is operating in the internal EGR priority region B. When it is determined in step S2 that the operating condition is outside the internal EGR priority region B, the control proceeds to step S3. In other words, when the internal combustion engine 1 is not operating in the internal EGR priority region B, the engine control unit 19 still proceeds to normal control even though the oil temperature is less than the prescribed temperature.

When it is determined in step S2 that the operating conditions are in the internal EGR priority region B, the engine control unit 19 proceeds to step S4. In step S4, a required intake air amount needed to achieve a required torque is calculated based on the accelerator pedal position.

In step S5, the engine control unit 19 is configured to determine a target duration/lift, a target lift center angle, and a target negative pressure necessary to obtain the required intake air amount in accordance with the oil temperature obtained in step S1. The engine rotational speed is also taken into account in these calculations. Although there are innumerable combinations of duration, lift center angle, and negative pressure that would achieve the required intake air amount, the target duration, the target lift center angle and the target negative pressure are set so that the lower the oil temperature the smaller the duration and the more retarded the lift center angle of the characteristic used, as described previously. It will be apparent to those skilled in the art from this disclosure that there are various feasible methods of determining the values of these parameters (the target duration, the target lift center angle and the target negative pressure). For example, these values can be obtained by compensating corresponding values used during normal control in accordance with the oil temperature. Alternatively these values can be obtained from maps of these values plotted versus temperature by looking up these values for the oil temperature.

In step S6, a target throttle valve opening degree TVO is calculated based on these parameters and the target torque.

In step S7, the throttle valve 18 is controlled to the target opening degree TVO. Also, in step S7, the lift/duration varying mechanism 51 and phase varying mechanism 52 of the variable valve operating mechanism 2 are controlled to achieve the target duration and the target lift center angle, respectively.

Accordingly, the intake control apparatus of the present invention reduces the pumping loss by operating in a substantially throttle-less manner, and thus, allows the fuel consumption to be improved. The intake control apparatus of the present invention can improve fuel consumption even further by using a comparatively large lift and duration of the intake valves 3 when the internal combustion engine 1 is operating in the internal EGR priority region B where the load is low. Moreover, when the temperature of the internal combustion engine 1 is low, the intake control apparatus of the present invention controls the intake valves 3 to a small lift value even if the internal combustion engine 1 is operating in the internal EGR priority region B, thus promoting atomization of the fuel. This feature is advantageous in terms of reducing hydrocarbons and improving fuel consumption when the temperature of the internal combustion engine 1 is low.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2002-363229. The entire disclosure of Japanese Patent Application No. 2002-363229 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An intake control apparatus for an internal combustion engine comprising:
a variable valve operating mechanism configured and arranged to change a valve lift characteristic of a plurality of intake valves;
a collector connected to a plurality of intake passages fluidly coupled to a plurality of cylinders of the internal combustion engine;
a throttle valve adjustably positioned upstream of the collector to control an amount of air drawn into the collector by changing an opening degree of the throttle valve; and
a control unit configured to adjust the opening degree by controlling the throttle valve and to adjust the valve lift characteristic by controlling the variable valve operating mechanism such that an intake air amount drawn into the cylinders reaches a target intake air amount that is set according to operating conditions of the internal combustion engine,
the control unit being further configured to adjust the valve lift characteristic by controlling the variable valve operating mechanism to change the intake air amount while maintaining the opening degree of the throttle valve substantially at an opening degree that achieves a first prescribed negative pressure inside the collector when the internal combustion engine is operating in a valve control region including medium loads,
the control unit being further configured to control the throttle valve to change the opening degree to achieve a second prescribed negative pressure that is more negative than the first prescribed negative pressure of the valve control region, and to adjust the valve lift characteristic by controlling the variable valve operating mechanism to control the intake air amount so that internal EGR is promoted with the second prescribed negative pressure when the internal combustion engine is operating in an internal EGR priority region including loads lower than the medium loads in the valve control region,
the control unit being further configured to adjust the valve lift characteristic of the intake valves by controlling the variable valve operating mechanism and to adjust the pressure inside the collector closer to atmospheric pressure than the second prescribed negative pressure by controlling the opening degree of the throttle valve when the internal combustion engine is operating in the internal EGR priority region and a temperature of the internal combustion engine is lower than a prescribed temperature.

2. The intake control apparatus for the internal combustion engine as recited in claim 1, wherein
the variable valve operating mechanism includes a lift/duration varying mechanism configured and arranged to increase and decrease a lift and a duration of the intake valves simultaneously and continuously to change the valve lift characteristic of the intake valves.

3. The intake control apparatus for the internal combustion engine as recited in claim 2, wherein
the control unit is further configured to control the variable valve mechanism to achieve a relatively large lift and duration of the intake valves when the internal combustion engine is operating in the internal EGR priority region.

4. The intake control apparatus for the internal combustion engine as recited in claim 3, wherein
the control unit is further configured to control the variable valve mechanism to reduce the lift and the duration of the intake valves when the internal combustion engine is operating in the internal EGR priority region and the temperature of the internal combustion engine is lower than a prescribed temperature.

5. The intake control apparatus for the internal combustion engine as recited in claim 3, wherein
the control unit is further configured to adjust the opening degree of the throttle valve to adjust the pressure inside the collector case to the first prescribed negative pressure when the internal combustion engine is operating within the internal EGR priority region and the temperature of the internal combustion engine is lower than the prescribed temperature.

6. The intake control apparatus for the internal combustion engine as recited in claim 2, wherein
the control unit is further configured to control the variable valve mechanism to reduce the lift and the duration of the intake valves when the internal combustion engine is operating in the internal EGR priority region and the temperature of the internal combustion engine is lower than a prescribed temperature.

7. The intake control apparatus for the internal combustion engine as recited in claim 2, wherein
the control unit is further configured to adjust the opening degree of the throttle valve to gradually change the pressure inside the collector toward the second prescribed negative pressure, and to control the variable valve operating mechanism to gradually increase the lift and duration of the intake valve as the temperature of the internal combustion engine rises.

8. The intake control apparatus for the internal combustion engine as recited in claim 2, wherein
the variable valve operating mechanism comprises a phase varying mechanism configured and arranged to advance and retard a lift center angle of the intake valves to change the valve lift characteristic of the intake valves.

9. The intake control apparatus for the internal combustion engine as recited in claim 8, wherein
the lift/duration varying mechanism is further configured and arranged to reduce the lift and the duration when the internal combustion engine is operating in the internal EGR priority region and the temperature of the internal combustion engine is lower than the prescribed temperature, and
the phase varying mechanism is further configured and arranged to retard the lift center timing when the internal combustion engine is operating in the internal EGR priority region and the temperature of the internal combustion engine is lower than the prescribed temperature.

10. The intake control apparatus for the internal combustion engine as recited in claim 8, wherein
the phase varying mechanism is further configured and arranged to retard the lift center angle such that an intake valve open timing comes after a top dead center when the temperature of the internal combustion engine is lower than the prescribed temperature.

11. The intake control apparatus for the internal combustion engine as recited in claim 1, wherein
the control unit is further configured to adjust the opening degree of the throttle valve to adjust the pressure inside the collector case to the first prescribed negative pressure when the internal combustion engine is operating within the internal EGR priority region and the temperature of the internal combustion engine is lower than the prescribed temperature.

12. An intake control apparatus for an internal combustion engine comprising:
variable valve operating means for changing a valve lift characteristic of a plurality of intake valves;
collecting means for collecting an intake air and sending the intake air to a plurality of intake passages fluidly coupled to a plurality of cylinders of the internal combustion engine;
throttle valve means for controlling an amount of air drawn into the collector by changing an opening degree of the throttle valve means; and
control means for adjusting the opening degree of the throttle valve means and for adjusting the valve lift characteristic of the intake valves by controlling the variable valve operating means such that an intake air amount drawn into the cylinders reaches a target intake air amount that is set according to operating conditions of the internal combustion engine,
the control means being further configured to adjust the valve lift characteristic by controlling the variable valve operating means to change the intake air amount while maintaining the opening degree of the throttle valve means substantially at an opening degree that achieves a first prescribed negative pressure inside the collector means when the internal combustion engine is operating in a valve control region including medium loads,
the control means being further configured control the throttle valve to change the opening degree to achieve a second prescribed negative pressure that is more negative than the first prescribed negative pressure of the valve control region and to adjust the valve lift characteristic by controlling the variable valve operating mechanism to control the intake air amount so that internal EGR is promoted with the second prescribed negative pressure when the internal combustion engine is operating in an internal EGR priority region where a load is lower than the medium loads in the valve control region,
the control means being further configured to adjust the valve lift characteristic of the intake valves by controlling the variable valve operating mechanism and to adjust the pressure inside the collector means closer to atmospheric pressure than the second prescribed negative pressure by controlling the opening degree of the throttle valve when the internal combustion engine is operating in the internal EGR priority region and a temperature of the internal combustion engine is lower than a prescribed temperature.

13. A method for controlling an intake air for an internal combustion engine comprising:
changing a valve lift characteristic of a plurality of intake valves;
collecting the intake air in a collector and sending the intake air to a plurality of intake passages fluidly coupled to a plurality of cylinders of the internal combustion engine;
controlling an amount of the intake air drawn into the collector by changing an opening degree of a throttle valve positioned upstream of the collector;
controlling the opening degree of the throttle valve and the valve lift characteristic such that an intake air amount drawn into the cylinders reaches a target intake air amount that is set according to operating conditions of the internal combustion engine;

controlling the valve lift characteristic while maintaining the opening degree of the throttle valve substantially at an opening degree that achieves a first prescribed negative pressure inside the collector when the internal combustion engine is operating in a valve control region including medium loads;

controlling the opening degree of the throttle valve to achieve a second prescribed negative pressure that is more negative than the first prescribed negative pressure of the valve control region and to control the intake air amount by adjusting the valve lift characteristic so that internal EGR is promoted with the second prescribed negative pressure when the internal combustion engine is operating in an internal EGR priority region including loads lower than the medium loads in the valve control region; and adjusting the valve lift characteristic of the intake valves and the opening degree of the throttle valve to adjust the pressure inside the collector closer to atmospheric pressure than the second prescribed negative pressure when the internal combustion engine is operating in the internal EGR priority region and a temperature of the internal combustion engine is lower than a prescribed temperature.

* * * * *